United States Patent
Han et al.

(10) Patent No.: US 10,505,974 B2
(45) Date of Patent: Dec. 10, 2019

(54) NETWORK ATTACK DEFENSE SYSTEM AND METHOD

(71) Applicant: Alibaba Group Holding Limited, George Town (KY)

(72) Inventors: Xiao Han, Beijing (CN); Shuning Ge, Beijing (CN)

(73) Assignee: Alibaba Group Holding Limited, Cayman Islands (KY)

( * ) Notice: Subject to any disclaimer, the term of this patent is extended or adjusted under 35 U.S.C. 154(b) by 137 days.

(21) Appl. No.: 15/653,157

(22) Filed: Jul. 18, 2017

(65) Prior Publication Data

US 2018/0026994 A1 Jan. 25, 2018

(30) Foreign Application Priority Data

Jul. 22, 2016 (CN) .......................... 2016 1 0586673

(51) Int. Cl.
*H04L 29/06* (2006.01)

(52) U.S. Cl.
CPC ........ *H04L 63/145* (2013.01); *H04L 63/1425* (2013.01)

(58) Field of Classification Search
CPC .................................................. H04L 63/145
See application file for complete search history.

(56) References Cited

U.S. PATENT DOCUMENTS

| | | | |
|---|---|---|---|
| 7,451,489 B2 | 11/2008 | Cantrell | |
| 7,478,429 B2 | 1/2009 | Lyon | |
| 8,302,180 B1 | 10/2012 | Gudov | |
| 2002/0032871 A1 | 3/2002 | Malan | |
| 2005/0055399 A1 | 3/2005 | Savchuk | |
| 2008/0086434 A1 | 4/2008 | Chesla | |
| 2011/0055921 A1 | 3/2011 | Narayanaswamy | |

(Continued)

FOREIGN PATENT DOCUMENTS

| | | |
|---|---|---|
| CN | 105991511 | 10/2016 |
| KR | 20130141192 A | * 12/2013 |

OTHER PUBLICATIONS

Kruegel, Christopher, and Giovanni Vigna. "Anomaly detection of web-based attacks." Proceedings of the 10th ACM conference on Computer and communications security. ACM, 2003. (Year: 2003).*

(Continued)

*Primary Examiner* — Shawnchoy Rahman
(74) *Attorney, Agent, or Firm* — Van Pelt, Yi & James LLP (57) ABSTRACT

Network attack defense includes: obtaining a set of one or more statistical attributes for a protected site by gathering statistics for a set of one or more site attributes of the protected site, the site attributes indicating an operation mode of the protected site; determining, based on the set of one or more statistical attributes, that the protected site is to transition from a current operation mode to a target operation mode, wherein the current operation mode has a current defense strategy different from a target defense strategy of the target operation mode; and if the protected site is to transition from the current operation mode to the target operation mode, transitioning from the current operation mode to the target operation mode and applying the target defense strategy for the protected site instead of the current operation mode.

20 Claims, 9 Drawing Sheets

(56) References Cited

U.S. PATENT DOCUMENTS

| | | | |
|---|---|---|---|
| 2013/0347114 A1* | 12/2013 | Altman | H04L 63/1425 726/24 |
| 2014/0215618 A1* | 7/2014 | Striem Amit | G06F 21/55 726/23 |
| 2015/0055468 A1* | 2/2015 | Agarwal | H04L 49/9047 370/232 |
| 2016/0182542 A1 | 6/2016 | Staniford | |
| 2017/0324760 A1* | 11/2017 | Gorny | H04L 63/1425 |

OTHER PUBLICATIONS

Abbasi, Ahmed, et al. "Detecting fake websites: the contribution of statistical learning theory." Mis Quarterly (2010): 435-461. (Year: 2010).*

* cited by examiner

NETWORK ATTACK DEFENSE SYSTEM AND METHOD

CROSS REFERENCE TO OTHER APPLICATIONS

This application claims priority to People's Republic of China Patent Application No. 201610586673.9 entitled A NETWORK ATTACK DEFENSE SYSTEM, METHOD AND DEVICE, filed Jul. 22, 2016 which is incorporated herein by reference for all purposes.

FIELD OF THE INVENTION

The present application relates generally to network security and, more particularly, to network attack defense systems and networks.

BACKGROUND OF THE INVENTION

Hypertext transport protocol (HTTP) is the most popular mechanism for the application layer communication between clients and servers. Like other communication protocols, HTTP-based communication is vulnerable to flood attacks or distributed denial of service (DDoS) attacks. For example, when an attacker transmits a sufficiently large number of "GET" packets to an HTTP server to request access to the resources serviced thereby, the HTTP server eventually reaches its maximum capacity of processing "GET" packets and becomes unavailable to respond to legitimate users.

Presently, several measures are known for detecting HTTP flood attacks. For example, based on the statistics for a specific source IP or cookies of a specific source IP, the specific source IP is determined to be engaging in attacks if a frequency statistic exceeds a pre-determined threshold. Also, specific characteristics of a request (e.g., whether a proxy header is present) can be used to detect attacks. Further, the statistics for the distribution of specific fields for data packets from a specific source IP can be used to detect attacks. Lastly, attacks can be detected by using challenge-response tests, returning pages modified by the HTTP host to include a verification code page, a JavaScript page, HTTP set cookie headers, or the like, which is responded by legitimate client or human users but not by attack programs or bots.

However, the above-described measures typically have the defect of relying on fixed defense strategies, despite the fact that the network environment is ever changing and fixed defense strategies often lead to increased false positive rates (e.g., misidentifying and blocking normal traffic) and/or false negative rates (e.g., letting attack traffic go through the network) over time. Thus, there exists a need for increasing defense efficiency with decreased likelihoods of false positives and false negatives.

BRIEF DESCRIPTION OF THE DRAWINGS

Various embodiments of the invention are disclosed in the following detailed description and the accompanying drawings.

The drawings described here are intended to further the understanding of the present invention, and form a part of the present application. The exemplary embodiments in the present application and the descriptions thereof are intended to explain the present invention, and do not constitute inappropriate limitation of the scope of the present invention. Among the drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to allow persons skilled in the art to better understand the present invention, the technical solution of the present invention is described clearly and completely below in light of the drawings contained in the embodiments of the present invention. Obviously, the embodiments described are only a portion of the embodiments of the present invention, and do not represent the entirety of possible embodiments. Based on the embodiments contained in the present application, all other embodiments obtained by persons with ordinary technical skill in the art without the exertion of creative labor shall fall within the scope of protections of the present application.

It must be noted that the terms "first," "second," etc. in the description and claims of the present application, as well as in the drawings, are used to differentiate similar objects, and are not necessarily intended to describe a specific order or sequence. It should be understood that data used in this way is interchangeable in the appropriate situations, so that the embodiments of the present application described here can be implemented in sequences other than those shown or described here. Moreover, the terms "includes" and "has" and any variations thereof are intended to cover non-exclusive inclusion; for example, processes, methods, systems, products, or equipment that include a series of steps or units are not necessarily limited to the steps or units that are explicitly enumerated, but may comprise other steps or units that are not explicitly enumerated or are inherent to these processes, methods, systems, products, or equipment.

In order to facilitate understanding of the embodiments of the present disclosure, the terms used for the embodiments are defined as the following.

The term "site" as used herein refers to a website of an application or a service hosted on a computer network by a server, server application, software module, hardware module, and/or the like. A specific site has a specific pointer associated therewith, e.g., a URL (Uniform Resource Locator), as a universal mechanism to find and access a service from a web browser. A site URL comprises a server domain name such as www.sina.com.cn, www.sohu.com, and so on.

The term "site attribute" as used herein refers to an attribute that characterizes the features of a site in operation. For example, a site attribute can be a number of requests the site receives per second, a number of normal responses the site transmits per second, a number of responses the application transmits to indicate errors (e.g., error 500 as application errors and error 404 as page not found errors) per second, a number of requests that are deemed to be suspicious attacks received at the site per second, a number of concurrent connections that are open for particular destination IPs, a number of common user-agents indicated in HTTP packet fields (e.g., header fields), a number of concurrent HTTP cookies that are generated for particular web browsers, and/or the like.

The term "defense strategy" as used herein refers to the measures or rules deployed or applied by a site in defense against network attacks. For example, a defense strategy can include, but is not limited to, a range of tiered defense levels indicating a false negative rate and/or a set of one or more defense algorithms. In the examples discussed below, a defense algorithm is associated with a false positive rate. Examples of defense algorithms include cluster algorithm, transductive confidence machines for K-Nearest neighbors algorithm, etc.

The term "distributed denial of service (DDoS)" as used herein refers to using, e.g., the client-server technology, to launch DDoS attacks from a multitude of computers against one or more targets, with exponentially increased power of denying service. In general, an attacker uses a stolen account to install a DDoS master control program on one computer, which within a pre-determined period of time, communicates with a large number of agent programs already installed on numerous computers on the network. Upon the receipt of a command from the master control program, the agent programs launch the attack accordingly. Assisted with the client-server technology, the master control program is able to activate the hundreds and thousands of agent programs into attacking operation within seconds.

The term "hypertext transfer protocol (HTTP)" as used herein refers to a prevalent network communication protocol on the Internet, with which all the web pages or web files comply.

The term "HTTP Flood" or "HTTP GET Flood" or "CC attack" as used herein refers to a specific type of DDoS attack where an attacker generates legitimate HTTP GET requests with the assistance of, e.g., agent severs, and directs those GET requests to a victim host to achieve DDoS without revealing information about the attacker source or identity (also known as a challenge collapsar (CC)). Currently, with more and more people using web-based services to retrieve and distribute information, web security on the Internet has become a hot topic of the network security research. As the key protocol for web-based services, HTTP packets are often used by hackers to launch DDoS attacks, known as HTTP flood/HTTP get flood/CC attacks. The characteristic of these attacks is that the contents of legitimate requests and illegitimate requests are very similar, rendering the detection and defense against such attacks more difficult.

Figure 1:
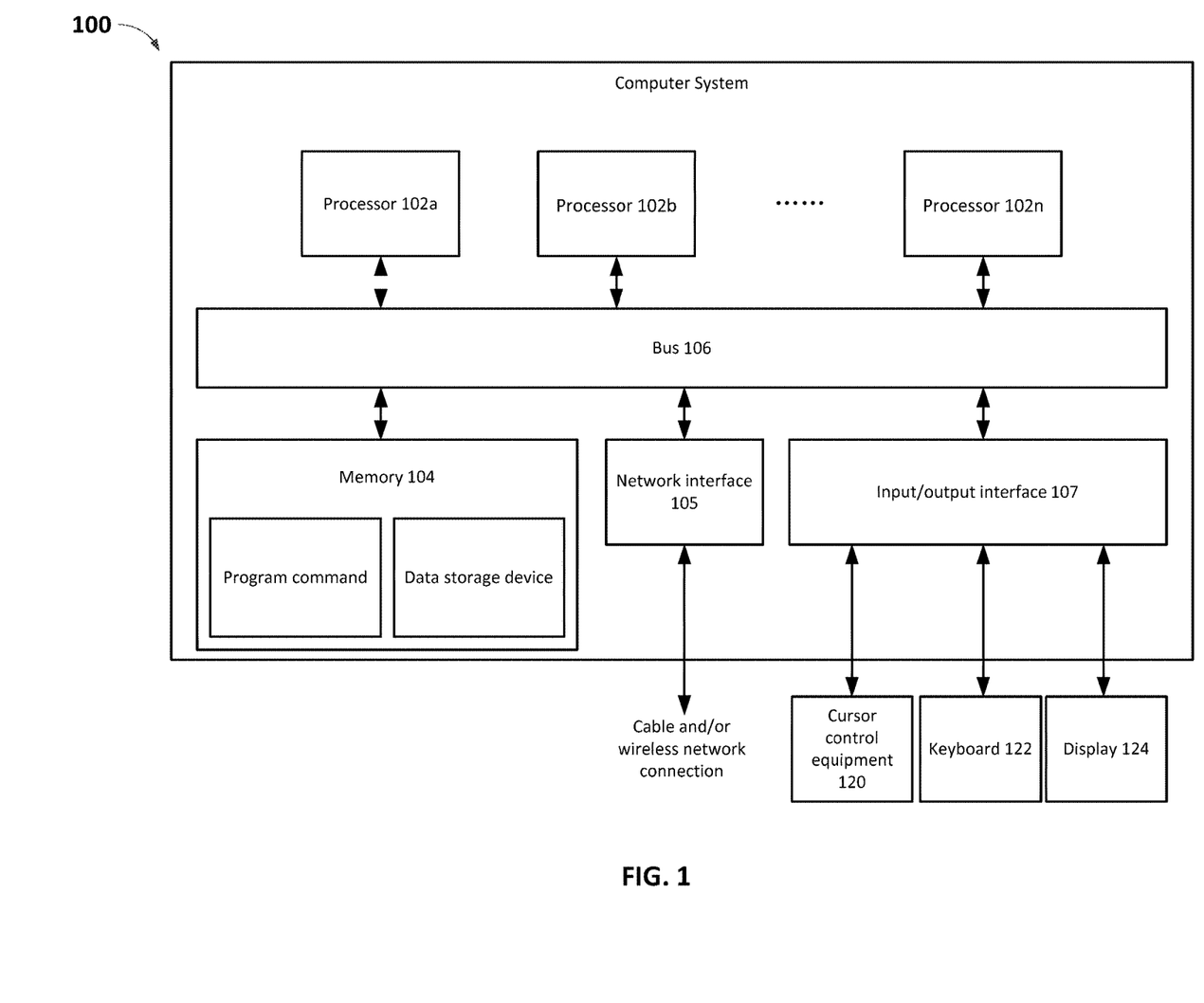
FIG. 1 is a functional diagram illustrating an embodiment of a programmed computer system for network attack defense, in accordance with one or more embodiments of the present disclosure.

FIG. 1 is a block diagram illustrating an embodiment of a programmed computer system configured to implement an example network attack defense system, in accordance with an embodiment of the present disclosure. System 100 can be used to implement the first device, the network, the web server system, and/or the second device (shown in FIG. 2) as appropriate. As will be apparent, other computer system architectures and configurations can be used to implement the systems and methods for network attack defense. Computer system 100, which includes various subsystems as described below, includes at least one microprocessor subsystem (also referred to as a processor or a central processing unit (CPU)) 102$a$, 102$b$, . . . , 102$n$. Processors 102$a$, . . . , 102$n$ can be implemented by microprocessors (MCU) or programmable logic devices (FPGA)). Using instructions retrieved from memory 104, processors 102$a$, 102$b$, . . . , 102$n$ control the reception and manipulation of input data, and the output and display of data on output devices (e.g., display 124).

Processors 102$a$, . . . , 102$n$ are coupled bi-directionally with memory 104, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processors 102$a$, . . . , 102$n$. Also as is well known in the art, primary storage typically includes basic operating instructions, program code, data, and objects used by processors 102$a$, . . . , 102$n$ to perform its functions (e.g., programmed instructions).

Network interface 105 is used to receive or send data over a network. Specific examples of said network may include the wireless network provided by the communications service provider for computer system 100. In one embodiment, network interface 105 comprises a network interface controller (NIC), which can link to other network equipment through a base station, thus enabling it to communicate with the internet. In one embodiment, network interface 105 may be a radio frequency (RF) module, which is used to communicate with the internet wirelessly.

Display 124 can be, for example, a touch-screen liquid crystal display (LCD), which is configured to allow users to interact with user interface 107 of the computer system 100.

In addition to providing processors 102a, . . . , 102n access to storage subsystems, bus 106 can also be used to provide access to other subsystems and devices. As shown, these can include a display 124, a network interface 105, a keyboard 122, and a cursor control 120, as well as an auxiliary input/output device interface, a sound card, speakers, and other subsystems as needed. For example, the cursor control 120 can be a mouse, stylus, track ball, or tablet, and is useful for interacting with a graphical user interface.

An auxiliary I/O device interface (not shown) can be used in conjunction with computer system 100. The auxiliary I/O device interface can include general and customized interfaces that allow processors 102a, . . . , 102n to send and, more typically, receive data from other devices such as microphones, touch-sensitive displays, transducer card readers, tape readers, voice or handwriting recognizers, biometrics readers, cameras, portable mass storage devices, and other computers.

Figure 2:
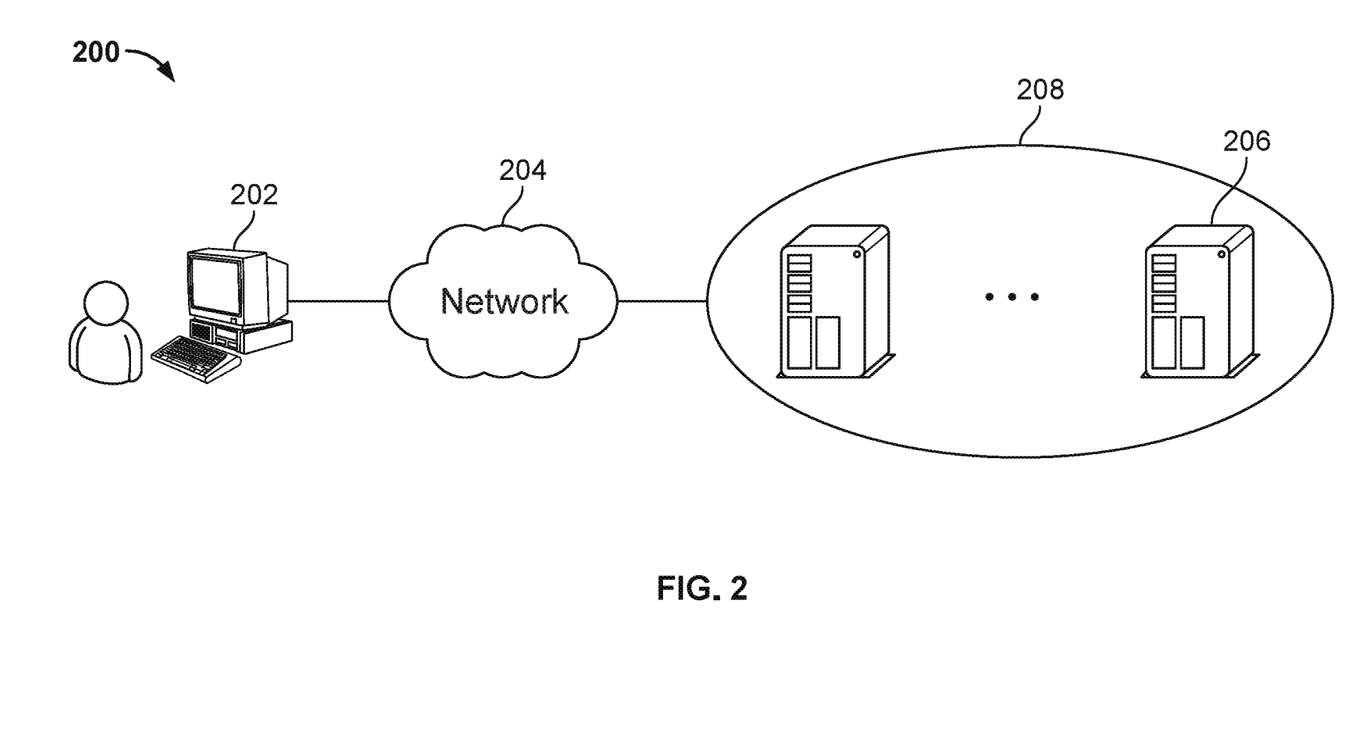
FIG. 2 is a diagram of an example network attack defense system illustrated in an example communication system, in accordance with one or more embodiments of the present disclosure.

FIG. 2 illustrates a block diagram of an example network attack defense system operating in an example communication system, in accordance with an embodiment of the present disclosure. The communication system 200 comprises one or more first devices 202 (only one of which is shown herein), a network 204, and a web server system 208 which includes one or more second devices 206. In other communication systems, the second devices can be outside the web server system. The web server system 208 hosts a protected site providing a service over the network 204. The one or more first devices 202 transmit packets through the network 204 to request and receive the service hosted at the web server system 208. In some embodiments, the first device 202, network 204, web server system 208, and second device 206 can be implemented by, for example, the computing system 100 of FIG. 1.

The first device 202 can be a client computing device, and can include one or more computing devices such as personal computers, laptops, personal digital assistants (PDAs), smart phones, wearable devices, standalone servers, distributed servers, or the like with one or more wired, wireless, or any other suitable communication connections to the network 204.

The network 204 can include a network of ISPs and other intermediate networks. The communication connection from the first device 202 to the second device 206 is formed through some of these networks for the transmissions of data packets from the first device 202 to the second device 206, and vice versa. It should be noted that although one first device 202, one network 204, one web server system 208, and one second device 206 are shown in FIG. 2 for the purpose of illustration, embodiments of the present disclosure can be applied to a plurality of first devices, networks, web server systems, and second devices, and the like.

The first device 202 can be a computing device from which an intended user transmits legitimate service requests to the protected site. On the other hand, the first device 202 can also be an attacker computing device, e.g., a zombie PC, remotely controlled by an attacker to launch network attacks such as DDoS attacks to the protected site. In the latter scenario, a plurality of first devices 202 can operate in concert to transmit service requests to the second device 206, consuming the computing resources available at the protected site to launch an attack thereon.

In this example, the second device 206 is the web server hosting the protected site. Therefore, the first device 202 is configured to send service requests to the protected site hosted on the second device 206. In some other embodiments, the second device 206 and the server hosting the protected site in the web server system 208 can be different network entities. The second device 206 can be a monitoring device overseeing the operations of multiple web server systems and installed in communication system 200. For example, the second device 206 can be installed in a router on the network 204, as a component of the web server system 208, or at a firewall (not shown).

In various embodiments, the second device 206 is configured to obtain statistical attributes for the protected site by gathering information from the service requests transmitted by the first device 202 and received at the server hosting the protected site. In this example, the second device 206 collects statistical information of the service requests received at the protected site. Statistical attributes are obtained for the site attributes of the protected site within a first pre-determined time interval. By using the obtained statistical attributes, it is determined that the protected site is to transition from the current operation mode to a target operation mode. The current operating mode has a current defense strategy and the target operating mode has a target defense strategy, the current defense strategy different from the target defense strategy. In response to the determination that the protected site is not to transition from the current operation mode to the target operation mode, the current strategy is maintained. Otherwise, the protected site transitions from the current operating mode to the target operating mode, and applies the target defense strategy for the protected site.

In some embodiments, the second device 206 is configured to retrieve HTTP packets received at the protected site, and to extract site attributes from the received HTTP packets. Site attributes include, for example, but are not limited to, the following categories of measurements: a number of requests the site receives per second, a number of normal responses the site transmits per second, a number of responses the application transmits to indicate errors per second, a number of requests suspicious of attacks received at the site per second, a number of concurrent connections that are open for particular destination IPs, a number of common user-agents indicated in HTTP packet fields, and a number of concurrent HTTP cookies that are generated for particular web browsers. By analyzing data of the site attributes of the same category, statistical attributes of various types are obtained for the protected site.

In some embodiments, the second device 206 is configured to obtain rolling averages for the above-described statistical attributes. Such rolling averages can be computed in cumulative or weighted forms. For example, a cumulative rolling average approach can be applied to obtain a number of requests the protected site has received per second during one or more time intervals up to the present time. A weighted rolling average approach can be applied to obtain to a number of requests the protected site received per second, with one or more multiplying factors as different weights to data sampled at, e.g., different points of time during the one or more time intervals up to the present time. The second device 206 is also configured to obtain a value of the time duration during which the protected site has been in the current operation mode. By using the afore-mentioned rolling averages of the statistical attributes together with the value of the time duration, it is determined whether the protected site is to transition from the current operation mode to the target operation mode.

In this example, the second device 206 is configured to input the afore-mentioned rolling averages, the statistical attributes, as well as the value of the time duration to a Boolean function to generate a result value. According to the result value, it is determined whether the protected site is to transition from the current operation mode to the target operation mode.

As used herein, a defense strategy includes one or more defense algorithms that have one or more defense levels. In this example, defense levels indicate the extent or degree of protection for the protected site. For example, a defense level of 1 indicates that the site is protected at the lowest level with a low false positive rate but a high false negative rate, and a defense level of 3 indicates that the site is protected at the highest level with a high false positive rate and a low false negative rate.

Figure 3:
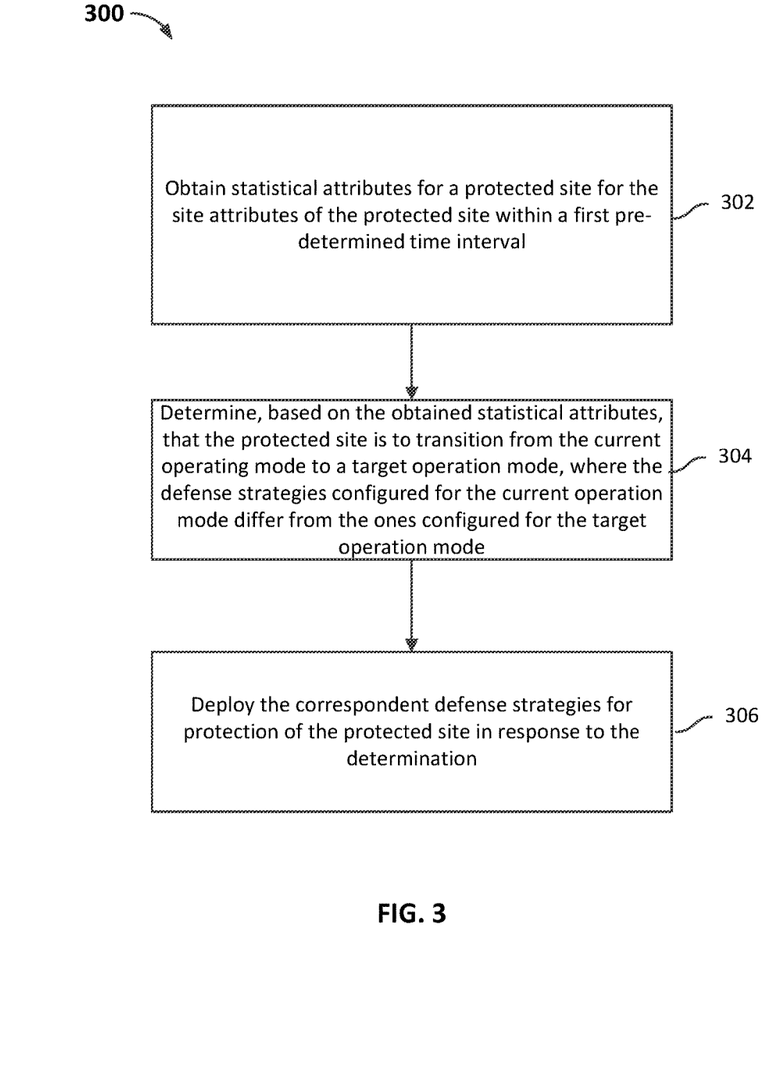
FIG. 3 is a flow chart of an example process of network attack defense, in accordance with one or more embodiments of the present disclosure.

FIG. 3 illustrates a flow chart of an example process of network attack defense, in accordance with an embodiment of the present disclosure. Process 300 can be implemented by, for example but not limed to, the second device 206 of FIG. 2.

Process 300 starts at 302, where statistical attributes for a protected site are obtained for the site attributes of the protected site within a first pre-determined time interval.

In this example, the statistical attributes are obtained by, for example but not limited to, retrieving the information of the HTTP packets received at the protected site. Site attributes are extracted from the received HTTP packets, and statistics analysis is performed over the site attribute data, which is sorted according to their respective categories as described above. In some embodiments, site attributes are extracted by parsing the HTTP request header fields to obtain the attribute data of the same type. Such types can be, for example, categories of HTTP fields of request methods, request URIs (Uniform Resource Identifiers), cookies, request parameters and request parameter corresponding keys, and the like. Thus, information embedded in the above described header fields can be obtained according to their respective types. Further, such types can be configuration based, can be identical or different (but specified as the same type), etc.

With the current web server technology, e.g., Apache, a web server can host multiple web sites at one IP address. Therefore, in this example, the second device 206 can host a plurality of web sites including the protected site and obtain HTTP traffic packets for the multiple sites. In this situation, at 302, HTTP packets transmitted for the plurality of data sources (e.g., multiple clients) are obtained, and categorized according to their respective destination sites. Then, HTTP packets intended for the protected site are obtained from the categorized data packets using the protected site information as the query.

At 304, based on the obtained statistical attributes, it is determined whether the protected site is to transition from the current operating mode to a target operation mode, where the defense strategies configured for the current operation mode differ from the ones configured for the target operation mode.

In some embodiments, in order to make the above-described determination, rolling averages of the above-mentioned statistic attributes, a value of the time duration during which the protected site has been in the current operation mode are further obtained. By using the obtained rolling averages, the statistical attributes, as well as the value of the time duration, it is determined whether the protected site is to transition, switching from the current operation mode to a target operation mode.

In various embodiments, the determination based on the time duration, rolling averages, and statistic attributes can be made according to various rules or policies. For example, in some embodiments, these attributes (the time duration, rolling averages, and statistic attributes) are compared with their respective threshold values so as to generate their respective comparison results. Based in part of the comparison results, a final determination of whether the protected site is to transition from a current operation mode to a target operation mode is made accordingly. In some embodiments, when one or two or three of the comparison results satisfy a pre-determined condition, it is determined that the protected site is to transition from the current operation mode to the target operation mode. Otherwise, it is determined that the protected site is not to transition from the current operation mode to the target operation mode. In some other embodiments of the present disclosure, the determination is made by using a Boolean function corresponding to the protected site. The rolling averages, the statistical attributes, and the time duration are input into the Boolean function to generate a result value. Based on the generated result value, it is determined whether the protected site is to transition from the current operation mode to the target operation mode.

At 306, in response to the determination, the correspondent defense strategies are deployed for protection of the protected site. When it is determined that the protected site is to transition from the current operation mode to the target operation mode, defense strategies corresponding to the target operation mode are deployed. When it is determined that the protected site is not to transition from the current operation mode to the target operation mode, defense strategies corresponding to the current operation mode continue to be deployed.

In various embodiments of the present disclosure, the defense strategies include but are not limited to: defense levels and/or defense algorithms. In this example, the defense levels indicate the extent or degree of the protection for the protected site. In some embodiments, the extent or degree of protection against network attacks is indicated by a false negative rate. The lower a false negative rate associated with a defense strategy, the higher a degree of protection conferred thereby. For example, the defense levels can be classified into three levels: level 1, level 2, and level 3. Each level has a different defense threshold of decreasing values. For example, level 1 can correspond to the lowest false negative rate, level 2 an intermediate one, and level 3 the highest one. In some other embodiments, the extent of protection can be measured in various performance metrics such as legitimate traffic's goodput (e.g., the application-level throughput), delay, and loss rate.

In various embodiments, adjustment of the above-described defense levels can be implemented by using, but is not limited to, the following example. For a pre-determined second time interval, a false positive rate is obtained by gathering statistics for the protected site using known test data packets. The protected site has been deployed with a current defense strategy. When the false positive rate exceeds a respective threshold, the current deployed defense algorithm is to be changed. In addition, or independently, for a pre-determined third time interval and using known test data packets, a false negative rate is obtained for the protected site deployed with the defense strategy. When the false negative rate exceeds a respective threshold, the defense level is to be adjusted. More details of the adjustment of the defense level and defense algorithm are described below in connection with FIGS. 7A,7B, and 7C. The above-described adjustment is performed after the protected site is deployed with either the defense strategies corresponding to the current operation mode, or the defense strategies corresponding to the target operation mode, in response to the determination of whether the protected site is to transition from the current operation mode to the target operation mode.

Figure 4:
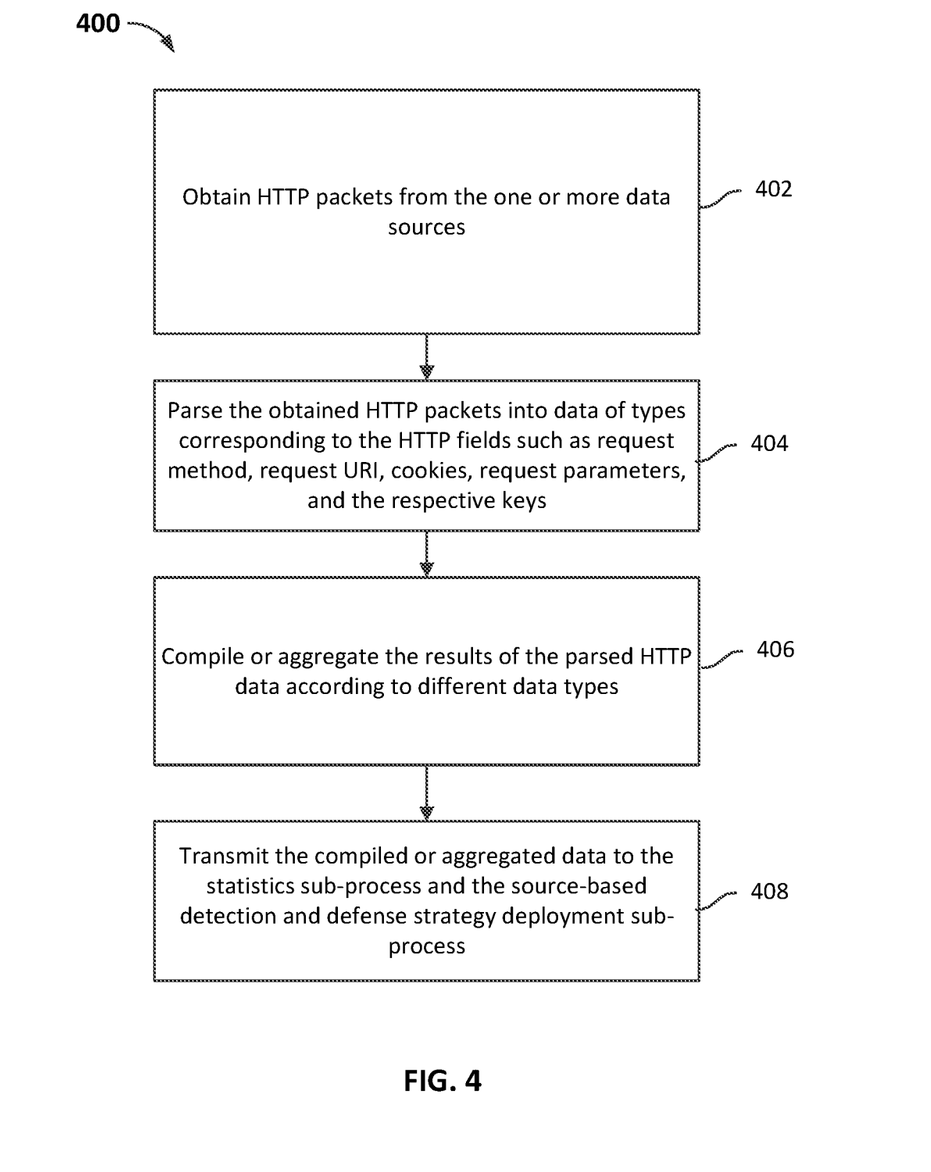
FIG. 4 is a flow chart of an example traffic data packet retrieval sub-process, in accordance with one or more embodiments of the present disclosure.

In various embodiments of the present disclosure, the process of network attack defense can be implemented by:
1) A traffic data packet retrieval sub-process
2) A site statistics sub-process
3) A site operation mode and rule management sub-process
4) A site status monitoring sub-process
5) A source-based security detection and defense strategy deployment sub-process FIG. 4 illustrates a flow chart of an example traffic data packet retrieval sub-process in accordance with an embodiment of the present disclosure. Sub-process 400 can be executed to implement, in part, for example, step 302 of process 300.

In this example, sub-process 400 is implemented to obtain site attribute data included in the HTTP header fields by using packet log analysis, side network packet monitoring, and layer seven load balancing devices. Next, these characteristics are aggregated and transmitted to the site statistics sub-process and the source-based detection and defense strategy deployment sub-process.

Sub-process 400 starts at 402, where the HTTP packets are obtained from the one or more data sources.

At 404, the obtained HTTP packets are parsed into data of types corresponding to the HTTP fields such as request method, request URI, cookies, request parameters and the respective keys, and the like.

At 406, the results of the parsed HTTP data are compiled or aggregated according to different data types. Details of 406 are described more fully below in connection with 506 of FIG. 5.

At 408, the compiled or aggregated data is transmitted to the statistics sub-process and the source-based detection and defense strategy deployment sub-process.

Figure 5:
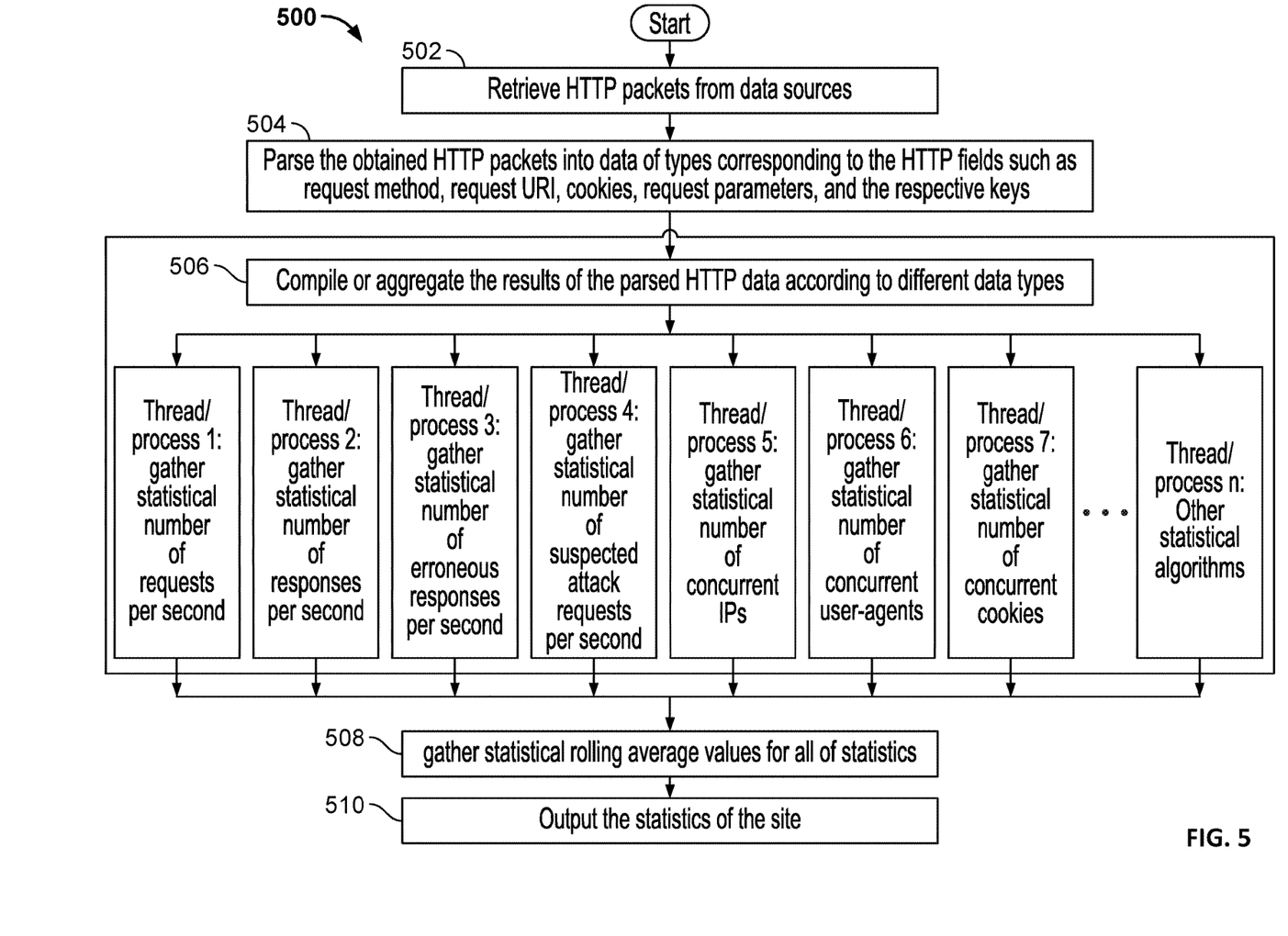
FIG. 5 is a flow chart of an example site statistics sub-process, in accordance with one or more embodiments of the present disclosure.

FIG. 5 illustrates a flow chart of an example site statistics sub-process in accordance with an embodiment of the present disclosure. Sub-process 500 can be executed to implement in part, for example, step 302 of process 300.

In this example, sub-process 500 is implemented to perform statistical analysis for the compiled or aggregated HTTP data obtained and classified by the sub-process 400. The statistical site attributes include but are not limited to: a number of requests per second, a number of normal responses per second, a number of abnormal or error responses per second, a number of requests deemed suspicious of attacks per second, existence of any peak value fluctuation of the afore-described four statistics, rolling averages of the afore-described first four statistics during various time intervals (e.g., 15 s/600 s/1800 s), a number of concurrent connections that are open for particular IPs, a number of concurrent cookies assigned from the site, a number of concurrent common user-agents, and the like.

Sub-process 500 starts at 502, where 502-506 can be performed similarly as 402-406 above.

At 506, various types of statistics are performed on the obtained HTTP data in order to derive site statistic attributes.

In this example, one or more threads of processes are implemented to perform a particular type of statistics over the HTTP data. Such threads or processes include, but are not limited to, thread or processes for obtaining: (1) a number of requests per second, (2) a number of normal responses per second, (3) a number of abnormal or error responses per second, (4) a number of requests deemed suspicious of attacks per second, (5) a number of concurrent connections that are open for particular IPs, (6) a number of concurrent common user-agents, (7) a number of concurrent cookies assigned from the site, and the like.

At 508, rolling averages values of all of the above-described statistics are computed over a pre-determined time interval, e.g., a time interval configured by a site administrator, as described above in connection with FIG. 2. The rolling average values are, amongst other values, input to a Boolean function to generate a result value indicating a binary decision of whether the protected site is to transition from the current operating mode to a target operating mode.

At s 510, the results are output for use by other processes or sub-processes of network attack defense, such as the site status monitoring sub-process.

Figure 6:
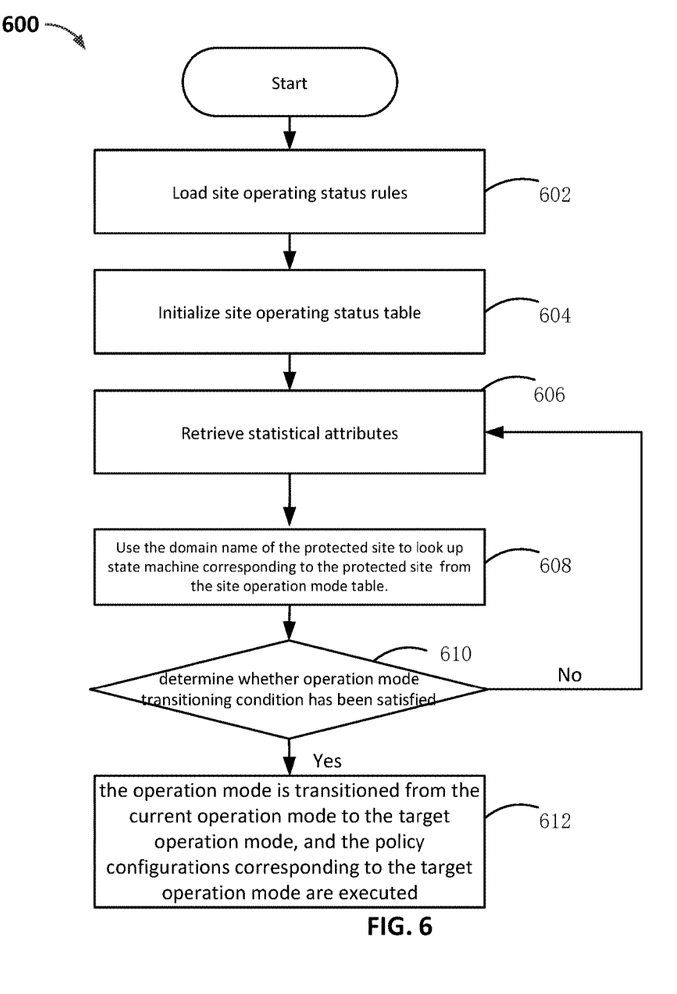
FIG. 6 is a flow chart of an example site status monitoring sub-process, in accordance with one or more embodiments of the present disclosure.

FIG. 6 illustrates a flow chart of an example site status monitoring sub-process in accordance with an embodiment of the present disclosure. Sub-process 600 can be executed to implement, for example, steps 304 and 306 of process 300.

In this example, sub-process 600 retrieves the statistical attributes computed by the site statistics sub-process 500, and, with the rules provided by the site operation mode and rule management sub-process (not illustrated), determines operation status and corresponding mode transitioning, if necessary. Upon an operation mode transitioning, sub-process 600 further dynamically configures the site-specific detection rules associated with the target operating mode.

Sub-process 600 starts at 602, where the site specific operation rules or policies are obtained. For example, the site specific operation rules can specify, e.g., traffic anomaly detection thresholds, traffic anomaly detection functions, or the like.

At 604, the site operation mode table is initialized such that a set of one or more site state machines indicating site operating mode maps to a set of one or more protected sites.

At 606, the statistical attributes are obtained from the site, using, for example, statistics sub-process 500.

At 608, using the domain name of the protected site, a state machine corresponding to the protected site is looked up from the site operation mode table.

At 610, it is determined whether the operation mode transitioning condition has been satisfied. How to make the determination is described more fully below in connection with FIGS. 7A-7C. In response to the determination that such condition is met, method follows the YES path to 612. Otherwise, sub-process 600 follows the NO path back to 606 to continue to collect and monitor the statistical attributes for the protected site.

At s 612, the operation mode is transitioned from the current operation mode to the target operation mode, and the policy configurations corresponding to the target operation mode are executed.

In this example, a source-based security detection and defense strategy deployment sub-process (not illustrated) uses the rules issued by the site status monitoring sub-process 600 to match the source-based statistics, specified request characteristics, and distribution statistics for specified source fields. Upon successful matches, the source-based security detection and defense strategy deployment sub-process further performs corresponding specific defenses, such as page blocking or sending human-machine interface challenges.

Figure 7A:
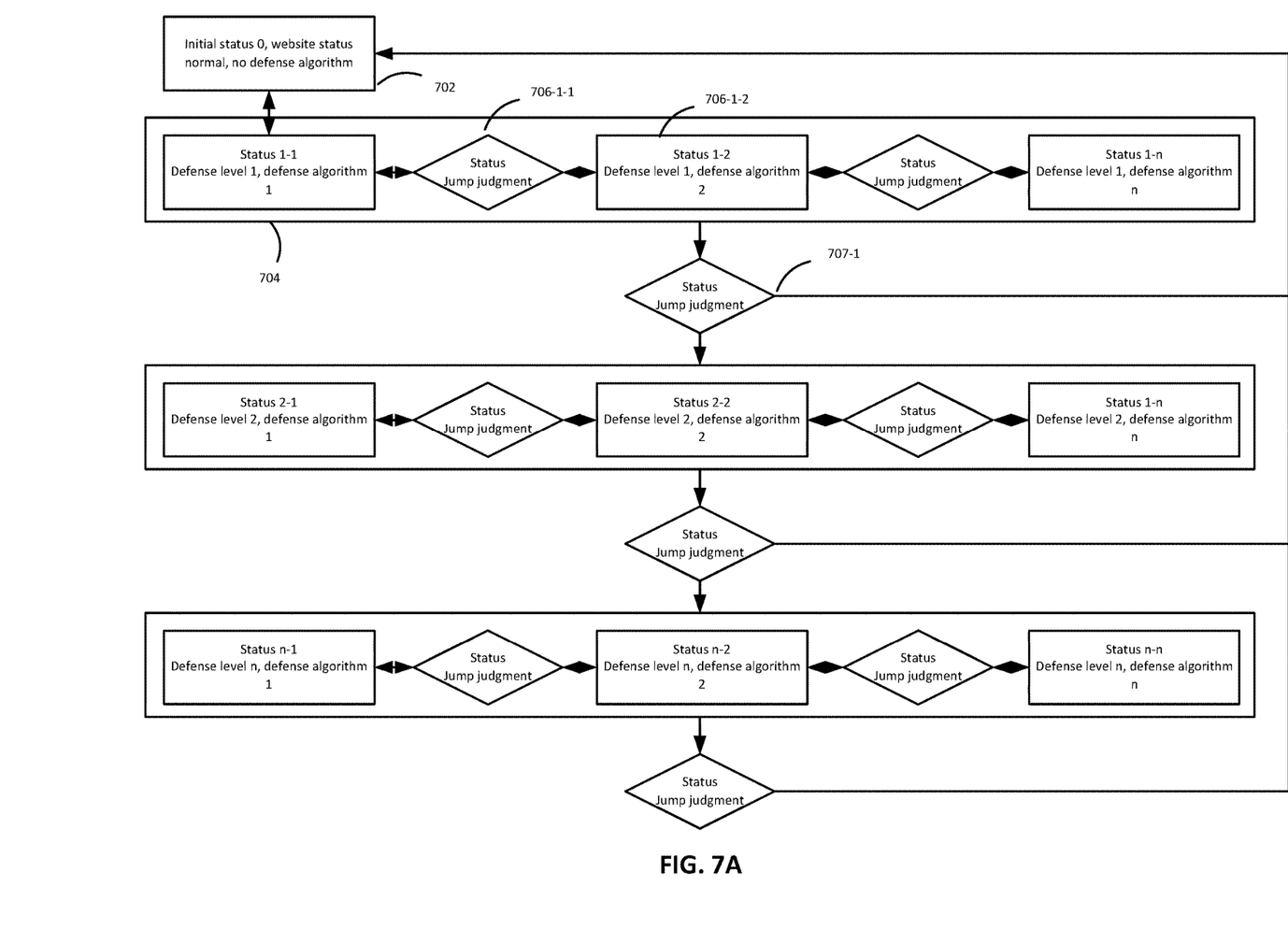
FIGS. 7A-7C are schematic diagrams of example operation transitions between defense levels and defense algorithms, in accordance with one or more embodiments of the present disclosure.

FIG. 7A illustrates a schematic diagram of example operation mode transitions between defense levels and defense algorithms in accordance with an embodiment of the present disclosure. Such transitions can be performed by a defense strategies adjusting sub-process, which can be executed to implement, for example, step 306 of process 300.

In this example, the defense strategies adjusting sub-process can be executed by the site status monitoring sub-process 600 to determine whether the defense strategies are to be adjusted, using the site statistics sub-process 500 to analyze a false negative rate and a false positive rate associated with the defense strategy in the current operation mode. If the false negative rate and/or the false positive rate exceeds their respective threshold, the defense strategies are to be adjusted. In some embodiments, the adjusting of the current defense strategy includes adjusting a corresponding defense algorithm, adjusting a corresponding defense level, or both.

As shown herein, the operation mode transition policy or rule is implemented as a Boolean function having n variables, the n variables being the statistic attributes output from sub-process 500. In particular, the variables include the following types of attributes: a number of requests per second, a number of normal responses per second, a number of error responses per second, a number of requests suspicious of attacks per second, the statistics of a number of concurrent connections that are open for particular IPs, a statistical number of concurrent common user-agents, and a statistical number of concurrent cookies, and the like. The variables further include rolling averages of these statistics attributes, and a value of time duration during which the protected site has been operating in the current operation mode. Given a specific set of input variables (e.g., operating attributes), the Boolean function provides a result of 1 or 0 (or other indicators of two distinct states such as yes or no). The Boolean function can be implemented as a set of logical functions and/or a mapping function that maps input variables into a decision of yes or no.

In some embodiments, the Boolean function is generated according to the above described attributes for the purposes of generating an operation mode transition decision. In other words, the operation mode transition decision dictates whether it is necessary for the protected site to undergo operation mode transition to a target operation mode, or it is to stay in the current operation mode.

As shown herein, the operation mode transition policy is a state machine comprising a plurality of individual statuses along a first dimension and a second dimension. Rows of status 1 . . . status n represent n degrees of defense, e.g., levels of false negative rates associated with the corresponding defense strategy. Within each level of a certain false negative rate, sub-status of each level, for example, status 1-1, status 1-2, . . . , status 1-n represent various defense algorithms corresponding to various levels of false positive rates at the same defense level 1, respectively. It should be noted that the number of defense levels and the number of defense algorithms are the same number n (as shown herein in FIGS. 7A-7C) for the purpose of illustration, the present disclosure can be applied to a state machine where the number of defense levels and the number of defense algorithms are different numbers.

In one embodiment, at 702, the state machine starts in an initial normal mode (status 0) where no DDoS attack is detected and hence no defense strategies are deployed. As HTTP packets are obtained by the sub-process 400 and analyzed, the state machine transitions to 704 of status 1-1, where the defense level is configured as level 1 and the defense algorithm is configured as algorithm 1.

At 706-1-1, n variables are input into the Boolean function to determine whether a status switch should occur. In this example, the Boolean function's input parameters include:

1) Numerical values for the number of requests per second, number of normal responses per second, number of erroneous responses per second, number of suspected attack requests per second, number of concurrent IPs tabulated, number of concurrent user-agents tabulated, and the number of concurrent cookies tabulated outputted by the macro statistics module.

2) Sliding average values for said numerical values outputted by the macro statistics module.

3) The duration since the jump to the current status.

Given the inputs, the Boolean function outputs an indicator of whether to transition to a different mode. If no, that means the current operating mode provides the desired protection to the protected site. If yes, the state machine enters into status 1-2, in which case the defense level is 1 and the algorithm being used is algorithm 2. At 706-1-2, the Boolean function is invoked again using the current input values. In this example, the process is forced to wait for a predetermined interval before the statistics are refreshed.

The invoking of the Boolean function and transitioning to the next status corresponding to a next defense algorithm at the same defense level is repeated for as long as necessary for the Boolean function to reach a determination that the operation mode does not need to transition to a new mode.

When the state machine reaches the last status at one defense level, e.g., status 1-n, at 707-1, the Boolean function is invoked to output an indicator of whether to transition to a different mode. If no, that means the current operating mode provides the desired protection to the protected site. If yes, the state machine enters into status 2-1, in which case the defense level is now 2 and the algorithm being used is algorithm 1. Again, the invoking of the Boolean function and transitioning to the next status corresponding to a next defense algorithm at the same defense level is repeated for as long as necessary for the Boolean function to reach a determination that the operation mode does not need to transition to a new mode.

Figure 7B:
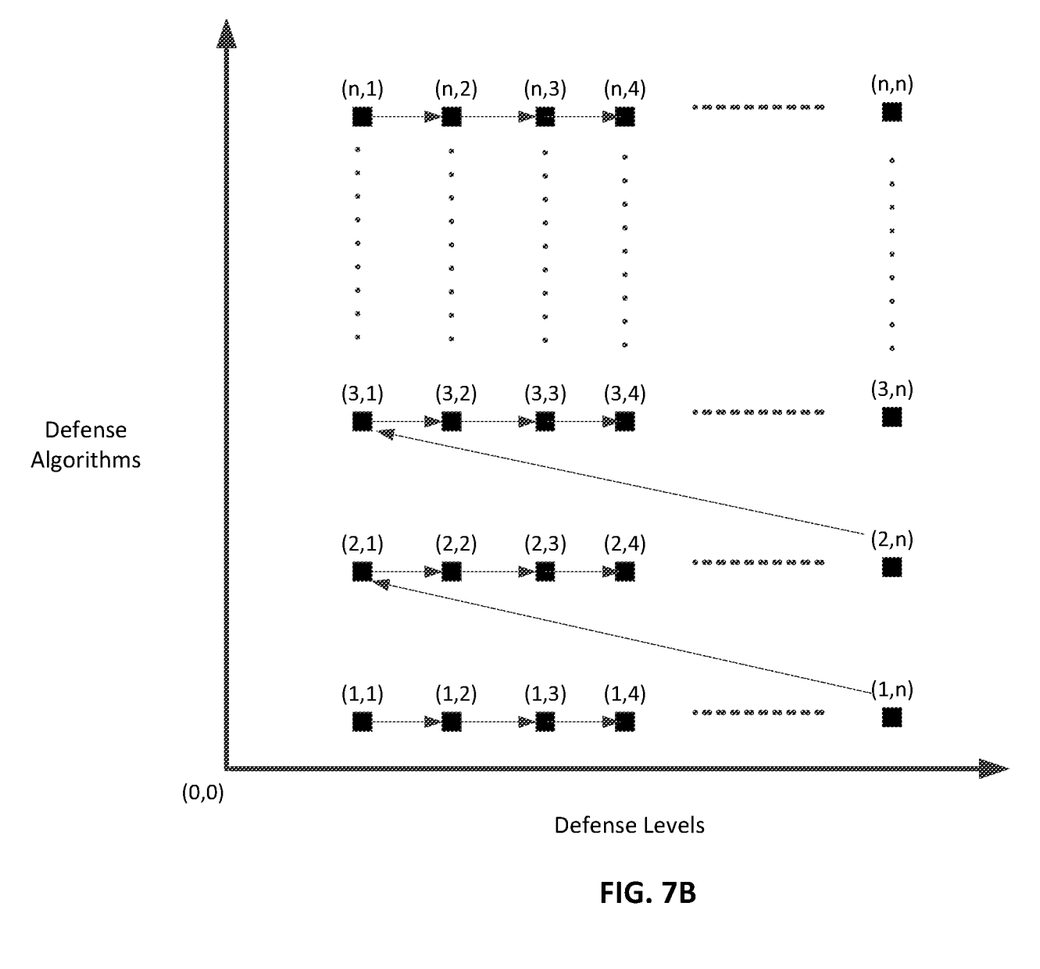

In this example, shown in FIG. 7B, the state machine is designed such that the switches occur within the same level as much as possible to allow for the false negative rate to be kept as low as possible. In other embodiments, as shown in FIG. 7C, the state machines are designed such that the switches occur for the same algorithm along different levels.

In particular, FIG. 7B is a two dimensional graph indicating an example state machine transitioning amongst its respective operating statuses in accordance with an embodiment of the present disclosure. Here, axis x represents the defense levels and axis y represents the defense algorithms. Hence, a plurality of operating statuses of the state machine is represented as a plurality of points in the graph, each point associated with a pair of numbers indicating the corresponding defense level first and defense algorithm second. The state machine starts at status (0,0) at the origin and then status (1,1). When the Boolean function keeps reaching a determination that the current operating mode needs to transition to a new operating state, the state machine traverses horizontally from (1,1) to (1,2), . . . , to (1,n) before transitioning vertically to (2,1), (2,2), and so on for as long as necessary for the Boolean function to reach a determination that the operation mode does not need to transition to a new mode.

Figure 7C:
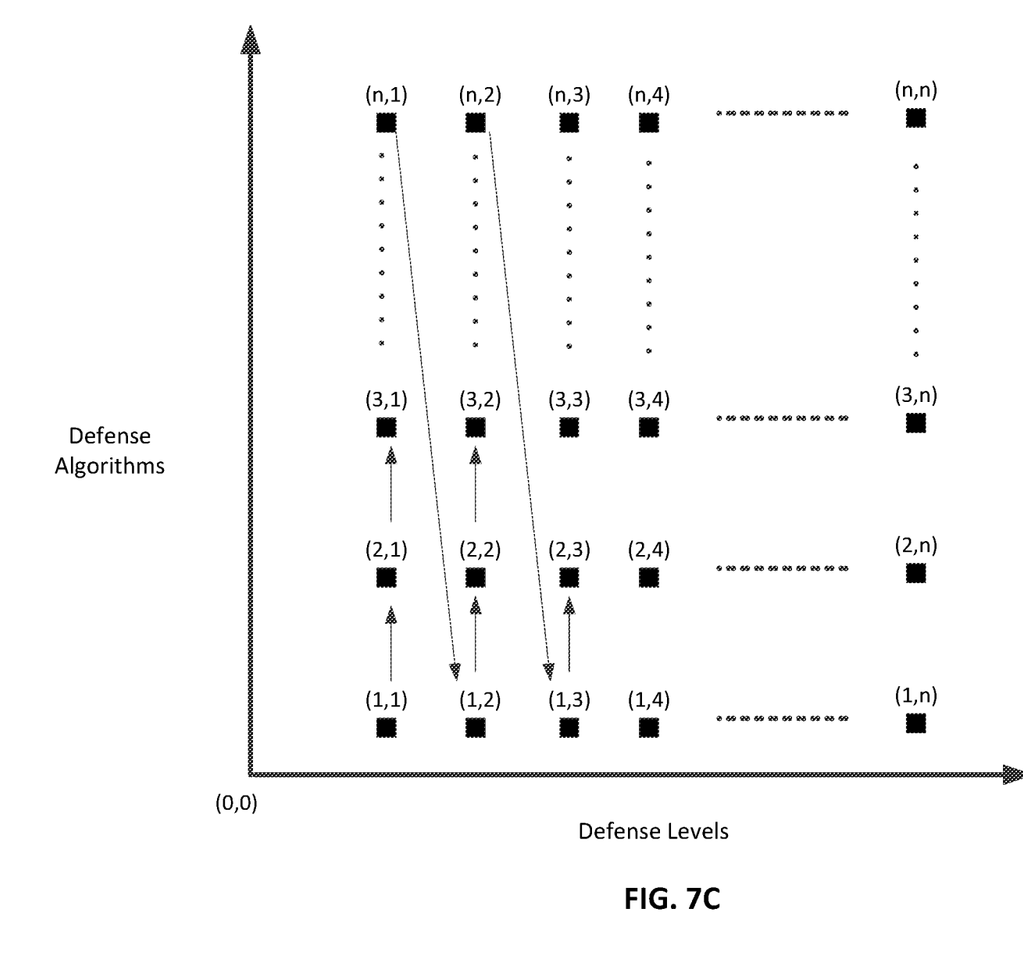

FIG. 7C is a two dimensional graph indicating another example state machine transitioning amongst its respective operating statuses in accordance with an embodiment of the present disclosure. Here, the state machine starts at status (0,0) at the origin and then status (1,1). When the Boolean function keeps reaching a determination that the current operating mode needs to transition to a new operating state, the state machine traverses vertically from (1,1) to (2,1), . . . , to (n,1) before transitioning in the horizontal direction and so on for as long as necessary for the Boolean function to reach a determination that the operation mode does not need to transition to a new mode.

The embodiments included in this description are described in a progressive manner. The explanation of each embodiment focuses on areas of difference from the other embodiments, and the descriptions thereof may be mutually referenced for portions of each embodiment that are identical or similar.

A person skilled in the art should understand that an embodiment of the present application may provide methods, devices, or computer program products. Therefore, the embodiments of the present application may take the form of embodiments that are entirely hardware, embodiments that are entirely software, and embodiments that combine hardware and software aspects. Moreover, embodiments of the present application may employ one or more forms of computer products that implement computer-operable storage media (including but not limited to magnetic disk storage devices, CD-ROMs, and optical storage devices) containing computer-operable computer code.

In one typical configuration, the computer equipment comprises one or more processors (CPUs), input/output interfaces, network interfaces, and memory. Memory may include such forms as volatile storage devices in computer-readable media, random access memory (RAM), and/or non-volatile memory, such as read-only memory (ROM) or flash memory (flash RAM). Memory is an example of a computer-readable medium. Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include transitory computer-readable media, (transitory media), such as modulated data signals and carrier waves.

The embodiments of the present application are described with reference to flowcharts and/or block diagrams based on methods, terminal equipment (systems), and computer program products of the embodiments of the present application. Please note that each flowchart and/or block diagram within the flowcharts and/or block diagrams and combinations of flowcharts and/or block diagrams within the flowcharts and/or block diagrams can be realized by computer commands. These computer program commands can be provided to the processors of general-purpose computers, specialized computers, embedded processor devices, or other programmable data processing terminals to produce a machine. The commands executed by the processors of the computers or other programmable data processing terminal equipment consequently give rise to devices for implementing the functions specified in one or more processes in the flowcharts and/or one or more blocks in the block diagrams.

These computer program commands can also be stored in computer-readable memory that can guide the computers or other programmable data processing terminal equipment to operate in a specific manner. As a result, the commands stored in the computer-readable memory give rise to products including command devices. These command devices implement the functions specified in one or more processes in the flowcharts and/or one or more blocks in the block diagrams.

These computer program commands can also be loaded onto computers or other programmable data processing terminal equipment and made to execute a series of steps on the computers or other programmable data processing terminal equipment so as to give rise to computer-implemented processing. The commands executed on the computers or other programmable data processing terminal equipment thereby provide the steps of the functions specified in one or more processes in the flowcharts and/or one or more blocks in the block diagrams.

Although preferred embodiments of the present application have already been described, a person skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network attack defense method comprising:
  obtaining a set of one or more statistical attributes for a protected site by gathering statistics for a set of one or more site attributes of the protected site, the set of one or more site attributes of the protected site indicating an operation mode of the protected site;
  determining, based at least in part on the set of one or more statistical attributes, that the protected site is to transition from a current operation mode to a target operation mode, wherein the current operation mode has a current defense strategy and the target operation mode has a target defense strategy, and wherein the current defense strategy differs from the target defense strategy, and the determining that the protected site is to transition from the current operation mode to the target operation mode comprises:
    obtaining rolling averages for the set of one or more statistical attributes; and
    using the one or more statistical attributes, and the rolling averages for the one or more statistical attributes to determine whether the protected site is to transition from the current operation mode to the target operation mode; and in response to the determination that the protected site is to transition from the current operation mode to the target operation mode, transitioning from the current operation mode to the target operation mode and applying the target defense strategy for the protected site.

2. The method of claim 1, wherein the obtaining of the set of one or more statistical attributes for the protected site comprises:
obtaining a plurality of HTTP packets received by the protected site within a specified time interval; and
extracting site attributes from the HTTP packets to gather statistics for site attributes of a same type of HTTP headers to obtain the set of the one or more statistical attributes.

3. The method of claim 2, wherein the obtaining of the plurality of HTTP packets comprises:
obtaining a set of HTTP packets from a plurality of data sources; and
categorizing the set of HTTP packets based on their respective destination sites to determine the plurality of HTTP packets for the protected site.

4. The method of claim 1, wherein the determining of the protected site is to transition from the current operation mode to the target operation mode further comprises:
obtaining a time duration during which the protected site has been in the current operation mode; and
determining whether the protected site is to transition from the current operation mode to the target operation mode based at least in part on: the one or more statistical attributes, the rolling averages for the one or more statistical attributes, and the time duration.

5. The method of claim 1, wherein the determining of the protected site is to transition from the current operation mode to the target operation mode comprises:
inputting the rolling averages, the one or more statistical attributes, and a time duration during which the protected site has been in the current operation mode into a Boolean function corresponding to the protected site to generate an output value; and
determining, by using the output value, that the protected site is to transition from the current operation mode to the target operation mode.

6. The method of claim 1, wherein the current defense strategy comprises a plurality of defense algorithms, wherein a defense algorithm in the plurality of defense algorithms has a corresponding plurality of defense levels, and wherein the corresponding plurality of defense levels indicates extents to which the protected site is protected.

7. The method of claim 6, wherein the set of one or more statistical attributes for the protected site indicates an operation mode of the protected site within a first pre-determined time interval; and wherein the method further comprises:
gathering statistics to obtain a false positive rate for the protected site during a second pre-determined time interval, wherein the protected site is deployed with the current defense strategy; and
adjusting the current defense strategy when the false positive rate exceeds a corresponding threshold value.

8. The method of claim 7, wherein the adjusting of the current defense strategy includes adjusting a corresponding defense algorithm, adjusting a corresponding defense level, or both.

9. The method of claim 1, wherein the set of one or more statistical attributes for the protected site indicates an operation mode of the protected site within a specified time interval.

10. A system, comprising:
one or more hardware processors configured to:
obtain a set of one or more statistical attributes for a protected site by gathering statistics for a set of one or more site attributes of the protected site, the set of one or more site attributes indicating an operation mode of the protected site;
determine, based on the set of one or more statistical attributes, that the protected site is to transition from a current operation mode to a target operation mode, wherein the current operation mode has a current defense strategy and the target operation mode has a target defense strategy, and wherein the current defense strategy differs from the target defense strategy, and to determine that the protected site is to transition from the current operation mode to the target operation mode comprises:
obtain rolling averages for the set of one or more statistical attributes; and
use the one or more statistical attributes, and the rolling averages for the one or more statistical attributes to determine whether the protected site is to transition from the current operation mode to the target operation mode; and
in response to the determination that the protected site is to transition from the current operation mode to the target operation mode, transition from the current operation mode to the target operation mode and apply the target defense strategy for the protected site instead of the current operation mode; and
one or more memories coupled to the one or more processors and configured to provide the one or more processors with instructions.

11. The system of claim 10, wherein to obtain the set of one or more statistical attributes for the protected site comprises to:
obtain a plurality of HTTP packets received by the protected site within a specified time interval; and
extract site attributes from the plurality of HTTP packets to gather statistics for site attributes of a same type of HTTP headers to obtain the set of the one or more statistical attributes.

12. The system of claim 11, wherein to obtain the plurality of HTTP packets comprises to:
obtain a set of HTTP packets from a plurality of data sources; and
categorize the set of HTTP packets based on destination sites to determine the plurality of HTTP packets for the protected site.

13. The system of claim 10, wherein to determine that the protected site is to transition from the current operation mode to the target operation mode comprises to:
obtain a time duration during which the protected site has been in the current operation mode; and
determine whether the protected site is to transition from the current operation mode to the target operation mode based at least in part on: the one or more statistical attributes, the rolling averages for the one or more statistical attributes, and the time duration.

14. The system of claim 10, wherein to determine that the protected site is to transition from the current operation mode to the target operation mode comprises to:
input the rolling averages, the one or more statistical attributes, and a time duration during which the protected site has been in the current operation mode into a Boolean function corresponding to the protected site to generate an output value; and determine, by using the output value, that the protected site is to transition from the current operation mode to the target operation mode.

15. The system of claim 10, wherein the current defense strategy comprises a plurality of defense algorithms, wherein a defense algorithm in the plurality of defense algorithms has a corresponding plurality of defense levels, and wherein the corresponding plurality of defense levels indicates extents to which the protected site is protected.

16. The system of claim 15, wherein the set of one or more statistical attributes for the protected site indicates an operation mode of the protected site within a first pre-determined time interval; and wherein the one or more processors are further configured to:
 gather statistics to obtain a false positive rate for the protected site during a second pre-determined time interval, wherein the protected site is deployed with the current defense strategy; and
 adjust the current defense strategy when the false positive rate exceeds a corresponding threshold value.

17. The system of claim 16, wherein to adjust the current defense strategy includes to adjust a corresponding defense algorithm, adjust a corresponding defense level, or both.

18. The System of claim 11, wherein the set of one or more statistical attributes for the protected site indicates an operation mode of the protected site within a specified time interval.

19. A computer program product for network attack defense, the computer program product being embodied in a non-transitory tangible computer readable storage medium and comprising computer instructions for:
 obtaining a set of one or more statistical attributes for a protected site by gathering statistics for a set of one or more site attributes of the protected site, the set of one or more site attributes indicating an operation mode of the protected site;
 determining, based on the set of one or more statistical attributes, that the protected site is to transition from a current operation mode to a target operation mode, wherein the current operation mode has a current defense strategy and the target operation mode has a target defense strategy, and wherein the current defense strategy differs from the target defense strategy, and the determining that the protected site is to transition from the current operation mode to the target operation mode comprises:
  obtaining rolling averages for the set of one or more statistical attributes; and
  using the one or more statistical attributes, and the rolling averages for the one or more statistical attributes to determine whether the protected site is to transition from the current operation mode to the target operation mode; and
 in response to the determination that the protected site is to transition from the current operation mode to the target operation mode, transitioning from the current operation mode to the target operation mode and applying the target defense strategy for the protected site instead of the current operation mode.

20. A method, comprising:
obtaining a set of one or more statistical attributes for a protected site by gathering statistics for a set of one or more site attributes of the protected site, the set of one or more site attributes of the protected site indicating an operation mode of the protected site within a first pre-determined time interval;
determining, based at least in part on the set of one or more statistical attributes, that the protected site is to transition from a current operation mode to a target operation mode, wherein the current operation mode has a current defense strategy and the target operation mode has a target defense strategy, and wherein the current defense strategy differs from the target defense strategy;
in response to the determination that the protected site is to transition from the current operation mode to the target operation mode, transitioning from the current operation mode to the target operation mode and applying the target defense strategy for the protected site;
gathering statistics to obtain a false positive rate for the protected site during a second pre-determined time interval, wherein the protected site is deployed with the current defense strategy; and
adjusting the current defense strategy when the false positive rate exceeds a corresponding threshold value.

* * * * *